US012769576B2

(12) United States Patent
Gowda et al.

(10) Patent No.: US 12,769,576 B2
(45) Date of Patent: Oct. 20, 2026

(54) LCS MICROVISOR TARGET DRIVER STACK OFFLOAD SYSTEM

(71) Applicant: Dell Products L.P., Round Rock, TX (US)

(72) Inventors: Srinivas Giri Raju Gowda, Fremont, CA (US); Shyamkumar T. Iyer, Cedar Park, TX (US); Douglas Lang Farley, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 18/426,713

(22) Filed: Jan. 30, 2024

(65) Prior Publication Data

US 2025/0245035 A1 Jul. 31, 2025

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
CPC .................................................... G06F 9/45558
USPC ............................................................... 718/1
See application file for complete search history.

(56) References Cited

U.S. PATENT DOCUMENTS

2014/0122636 A1* 5/2014 Peake ................. G06F 21/6218 709/213
2024/0330034 A1* 10/2024 Zhao ................... G06F 9/45558

* cited by examiner

*Primary Examiner* — Charlie Sun
(74) *Attorney, Agent, or Firm* — Joseph Mencher

(57) ABSTRACT

An LCS microvisor target driver stack offload system includes resource management system coupled to a target system and to a server device including a microvisor subsystem that provides an LCS having an LCS memory address space that does not include a target driver stack for the target system. The resource management system receives an SDXI communication from the microvisor subsystem using a first SDXI function, and uses a second SDXI function to provide a target command in the SDXI communication to a target emulation subsystem including the target driver stack for the target system. The resource management system then uses the target emulation subsystem to execute the target command with the target system and, as part of the target command execution, uses the first SDXI function to perform a data transfer between the LCS memory address space and target system using a PASID that is accessible using the SDXI communication.

20 Claims, 19 Drawing Sheets

1302

| ADDRESS KEY TABLE ENTRY | |
|---|---|
| | PASID |
| FUNCTION HANDLE | INTERRUPT NUMBER |
| | STEERING TAG |
| | RKEY |

FIG. 13B

LCS MICROVISOR TARGET DRIVER STACK OFFLOAD SYSTEM

BACKGROUND

The present disclosure relates generally to information handling systems, and more particularly to offloading target driver stacks from microvisors used in information handling systems to provide Logically Composed Systems (LCSs).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be used to provide users with Logically Composed Systems (LCSs) that include logical systems that perform workloads using the components in one or more server devices. For example, “Bare Metal” Servers (BMSs) may be provided with a microvisor that is used to provide such LCSs, with that microvisor enabling the connection of a variety of resource devices or other targets to the LCS for use by the LCS during its operation. However, the use of a microvisor to connect targets to an LCS raises some issues, as conventional LCS provisioning systems require the microvisor to carry corresponding driver stacks or other initiator stacks (i.e., an overall sequence of drivers utilized in Input/Output (I/O) requests for a target) for any targets that will be connected to the LCS, and one of skill in the art in possession of the present disclosure will appreciate how the disaggregated/composed system architectures used for LCSs allow a wide variety of resource devices and/or other targets to be connected to and used by those LCSs, requiring a relatively large target driver/initiator stack footprint for the microvisor.

Accordingly, it would be desirable to provide an LCS microvisor target driver stack offload system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: receive, from a microvisor subsystem that is coupled to the processing system, that is configured to provide a Logically Composed System (LCS) having an LCS memory address space, and that does not include a target driver stack for a target system that is coupled to the processing system, a Smart Data Accelerator Interface (SDXI) communication using a first Smart Data Accelerator Interface (SDXI) function provided by the resource management engine; provide, using a second SDXI function provided by the resource management engine, a target command in the SDXI communication to a target emulation subsystem that is provided by the resource management engine and that includes the target driver stack for the target system; execute, using the target emulation subsystem, the target command with the target system; and perform, using the first SDXI function and as part of the execution of the target command, a data transfer between the LCS memory address space and the target system using a Process Address Space IDentifier (PASID) that is accessible using the SDXI communication.

BRIEF DESCRIPTION OF THE DRAWINGS

FIG. 13B is a schematic view illustrating an embodiment of an SDXI table used by the LCS provisioning system of FIG. 7 operating during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
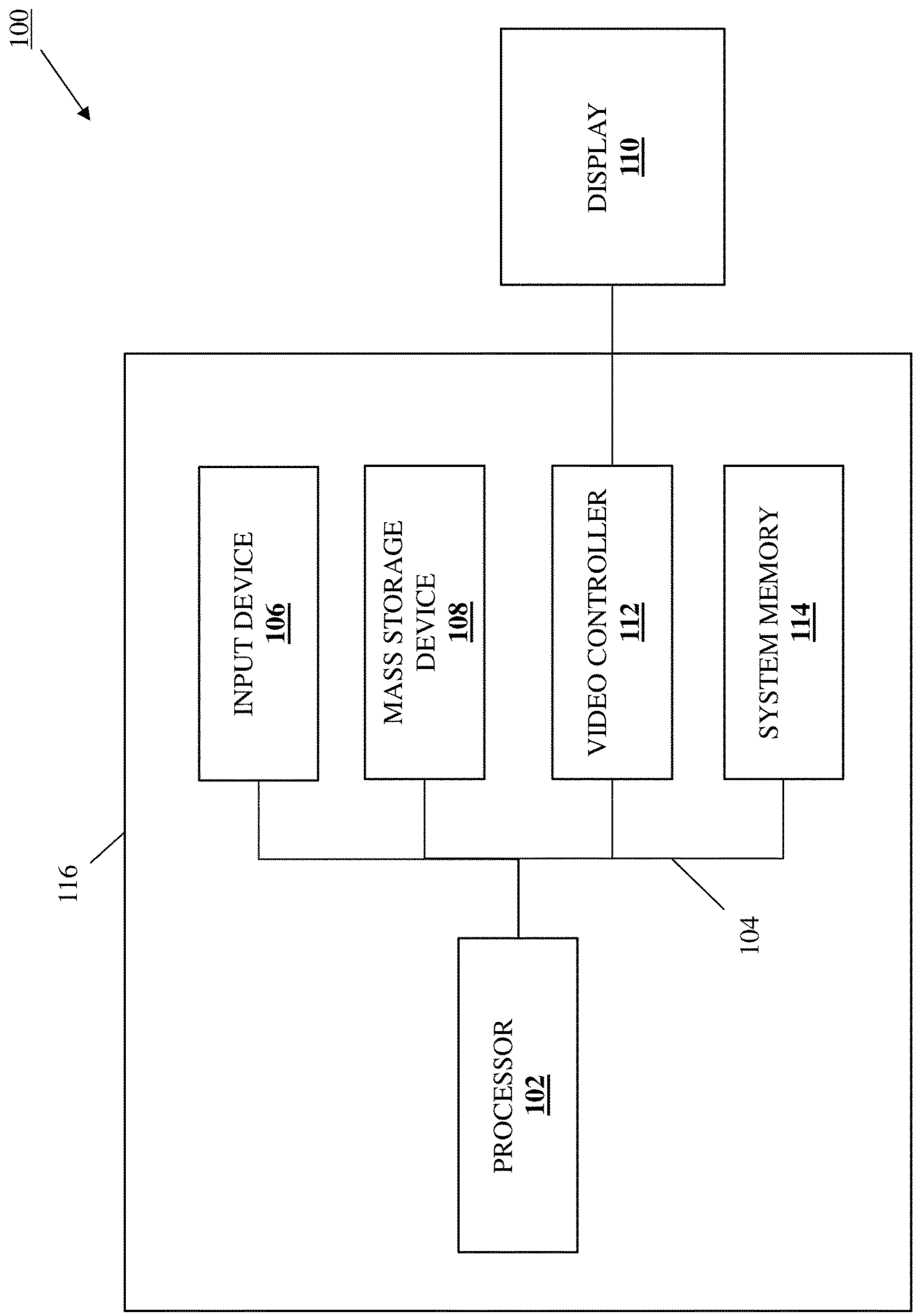
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) microvisor target driver stack offload systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
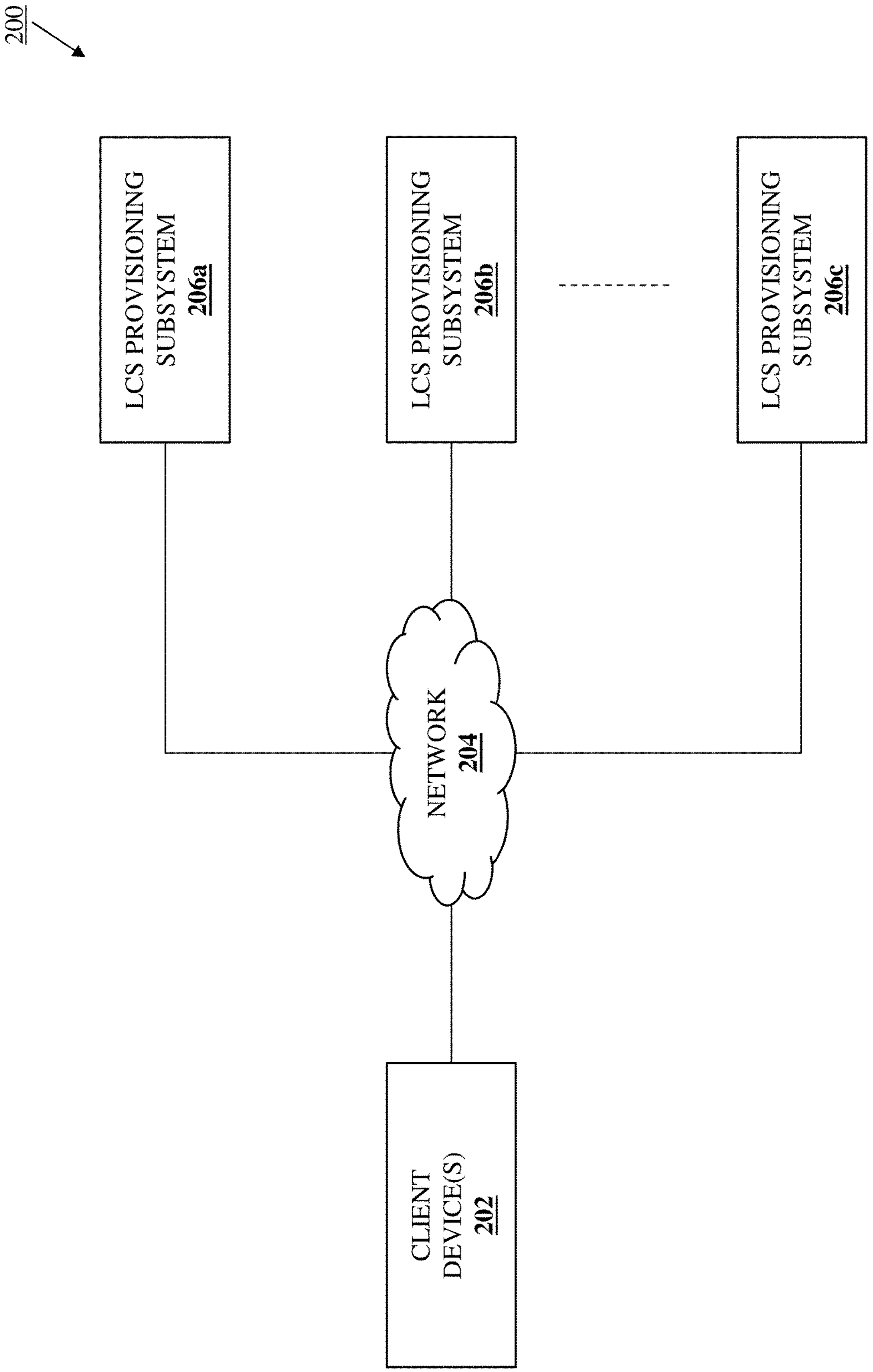
FIG. 2 is a schematic view illustrating an embodiment of an LCS provisioning system.

With reference to FIG. 2, an embodiment of a Logically Composed System (LCS) provisioning system 200 is illustrated that may be utilized with the LCS microvisor target driver stack offload systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
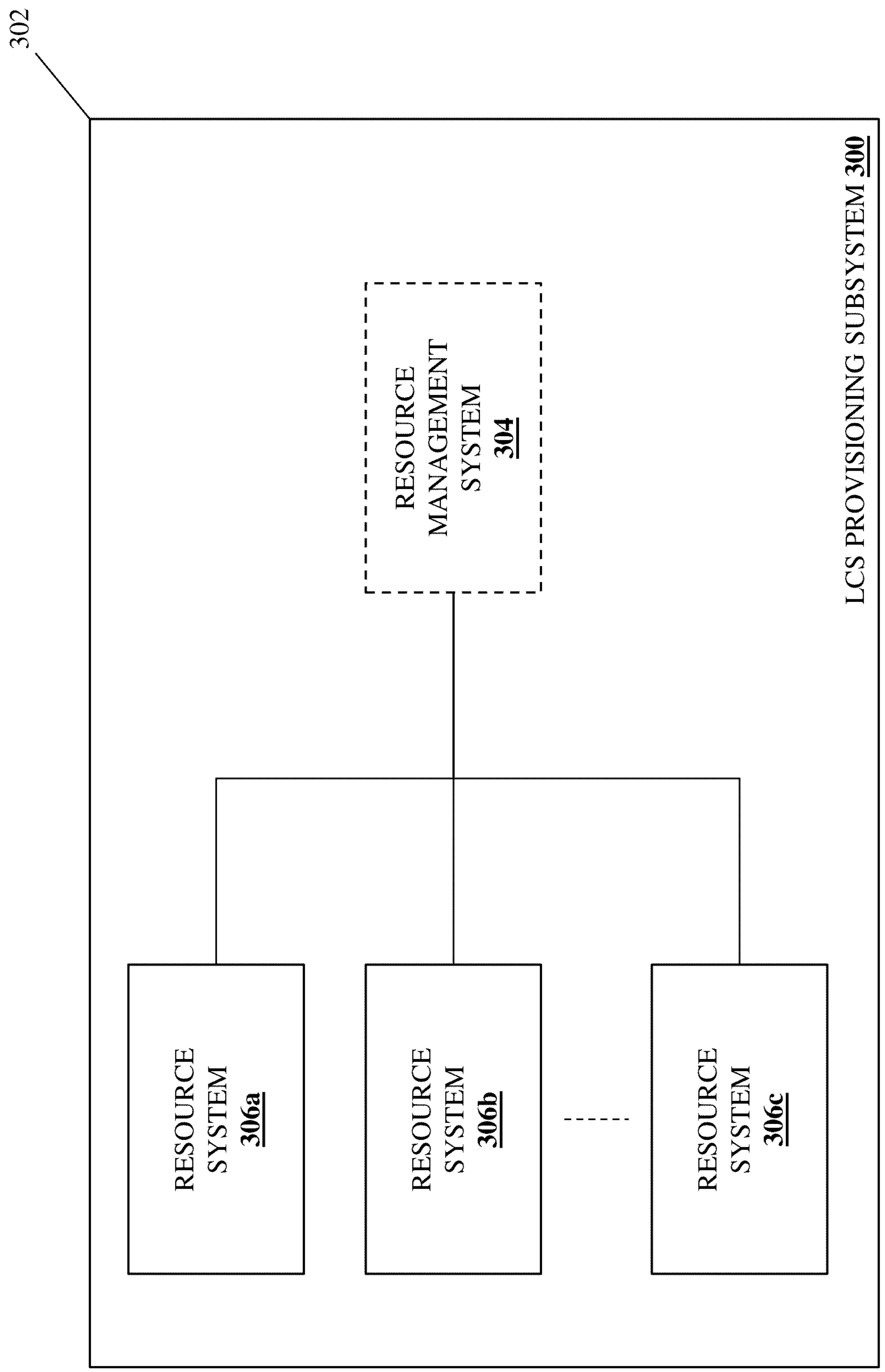
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
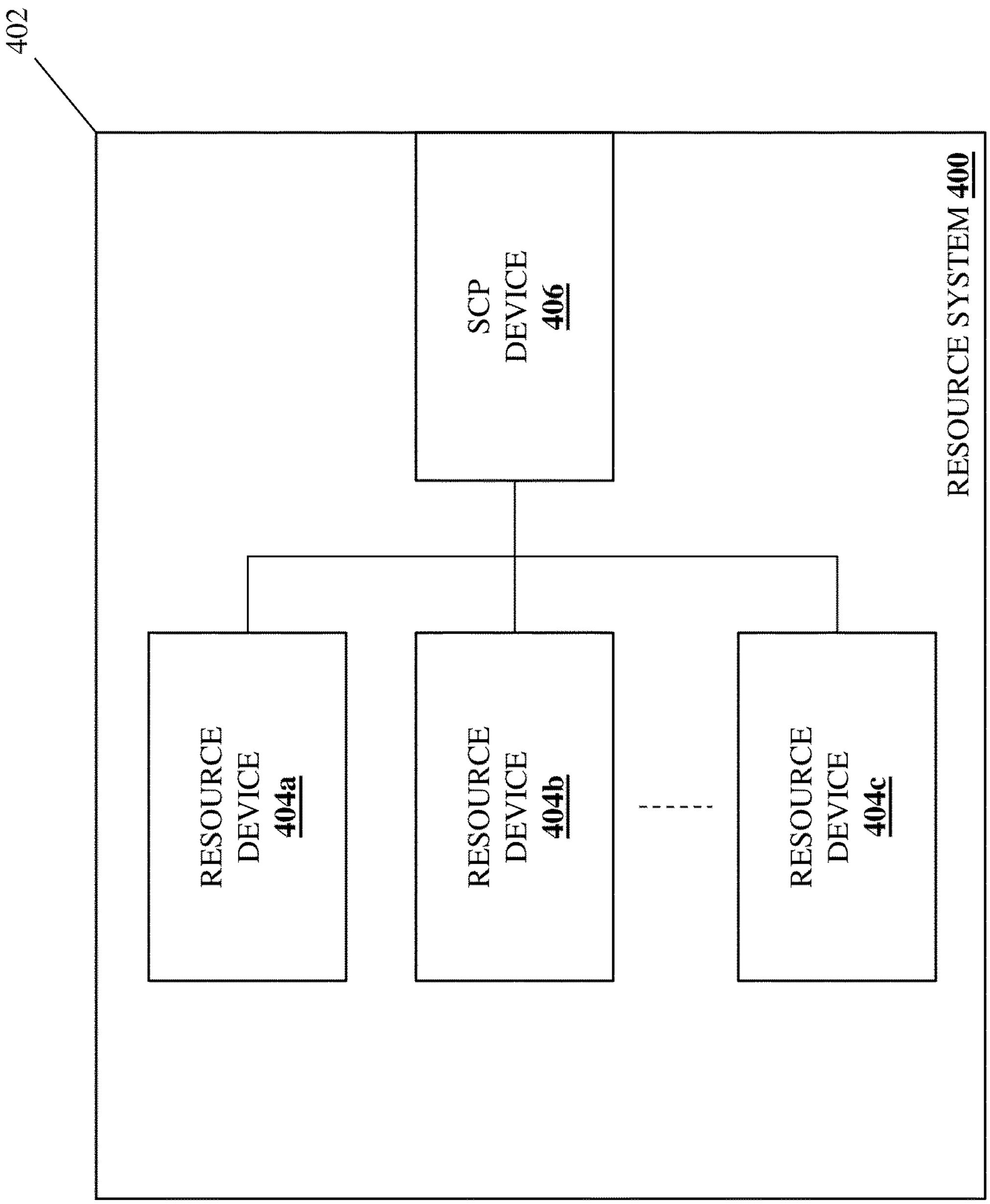
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404*a*-404*c*. For example, the chassis 402 of the resource system 400 may house a plurality of processing systems (i.e., the resource devices 404*a*-404*c*) coupled to the SCP device 406. In another example, the chassis 402 of the resource system 400 may house a plurality of memory systems (i.e., the resource devices 404*a*-404*c*) coupled to the SCP device 406. In another example, the chassis 402 of the resource system 400 may house a plurality of storage devices (i.e., the resource devices 404*a*-404*c*) coupled to the SCP device 406. In another example, the chassis 402 of the resource system 400 may house a plurality of networking devices (i.e., the resource devices 404*a*-404*c*) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404*a*-404*c* for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404*a*-404*c* while remaining within the scope of the present disclosure as well.

Figure 5:
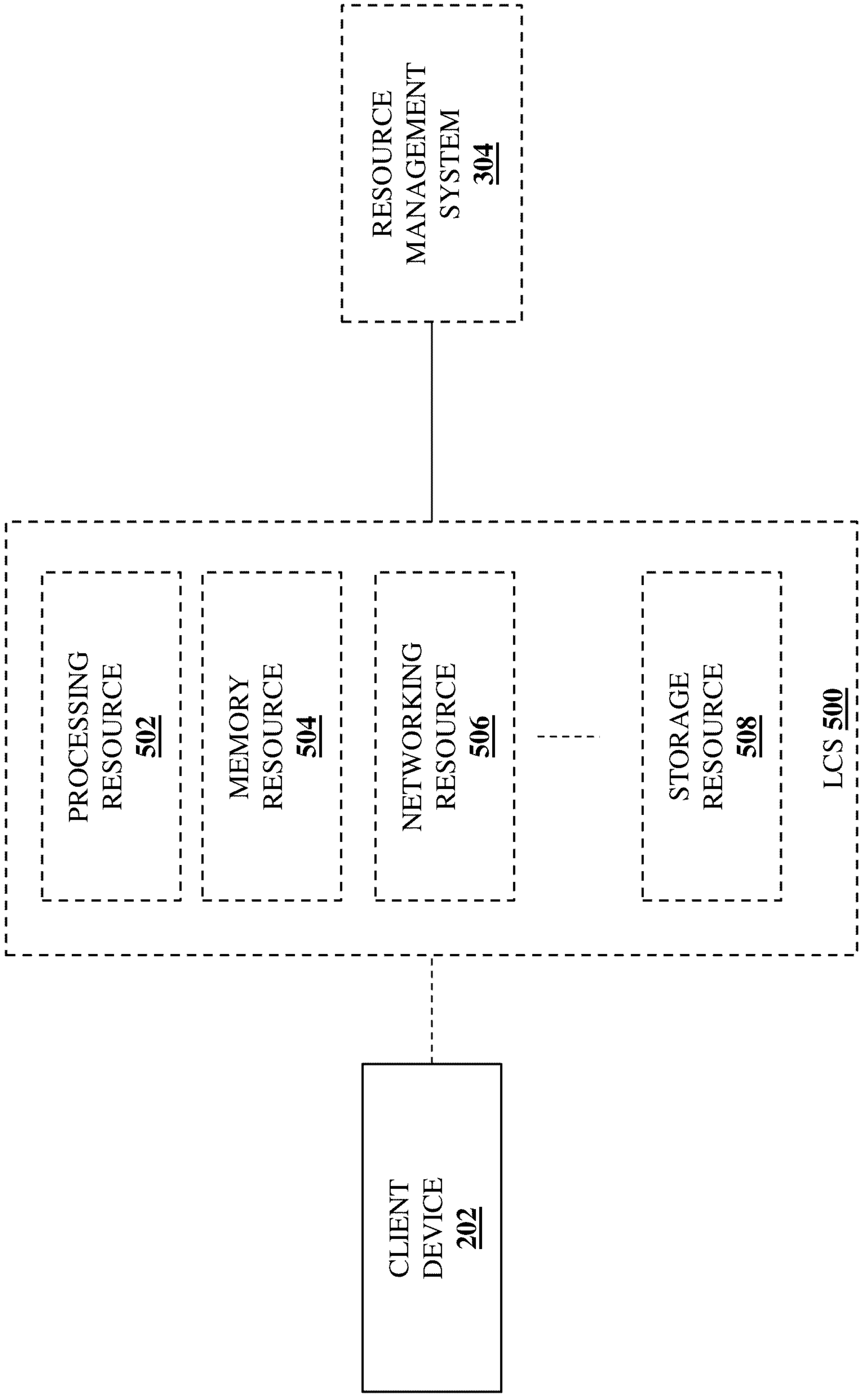
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206*a*-206*c*, and may be satisfied using resource systems that are included within that LCS provisioning subsystem, or satisfied using resource systems that are included across the different LCS provisioning subsystems 206*a*-206*c*.

As such, the resource management system 304 in the LCS provisioning subsystem that received the workload intent may operate to compose the LCS 500 using resource devices 404*a*-404*c* in the resource systems 306*a*-306*c*/400 in that LCS provisioning subsystem, and/or resource devices 404*a*-404*c* in the resource systems 306*a*-306*c*/400 in any of the other LCS provisioning subsystems. FIG. 5 illustrates the LCS 500 including a processing resource 502 allocated from one or more processing systems provided by one or more of the resource devices 404*a*-404*c* in one or more of the resource systems 306*a*-306*c*/400 in one or more of the LCS provisioning subsystems 206*a*-206*c*, a memory resource 504 allocated from one or more memory systems provided by one or more of the resource devices 404*a*-404*c* in one or more of the resource systems 306*a*-306*c*/400 in one or more of the LCS provisioning subsystems 206*a*-206*c*, a networking resource 506 allocated from one or more networking devices provided by one or more of the resource devices 404*a*-404*c* in one or more of the resource systems 306*a*-306*c*/400 in one or more of the LCS provisioning subsystems 206*a*-206*c*, and/or a storage resource 508 allocated from one or more storage devices provided by one or more of the resource devices 404*a*-404*c* in one or more of the resource systems 306*a*-306*c*/400 in one or more of the LCS provisioning subsystems 206*a*-206*c*.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices

404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
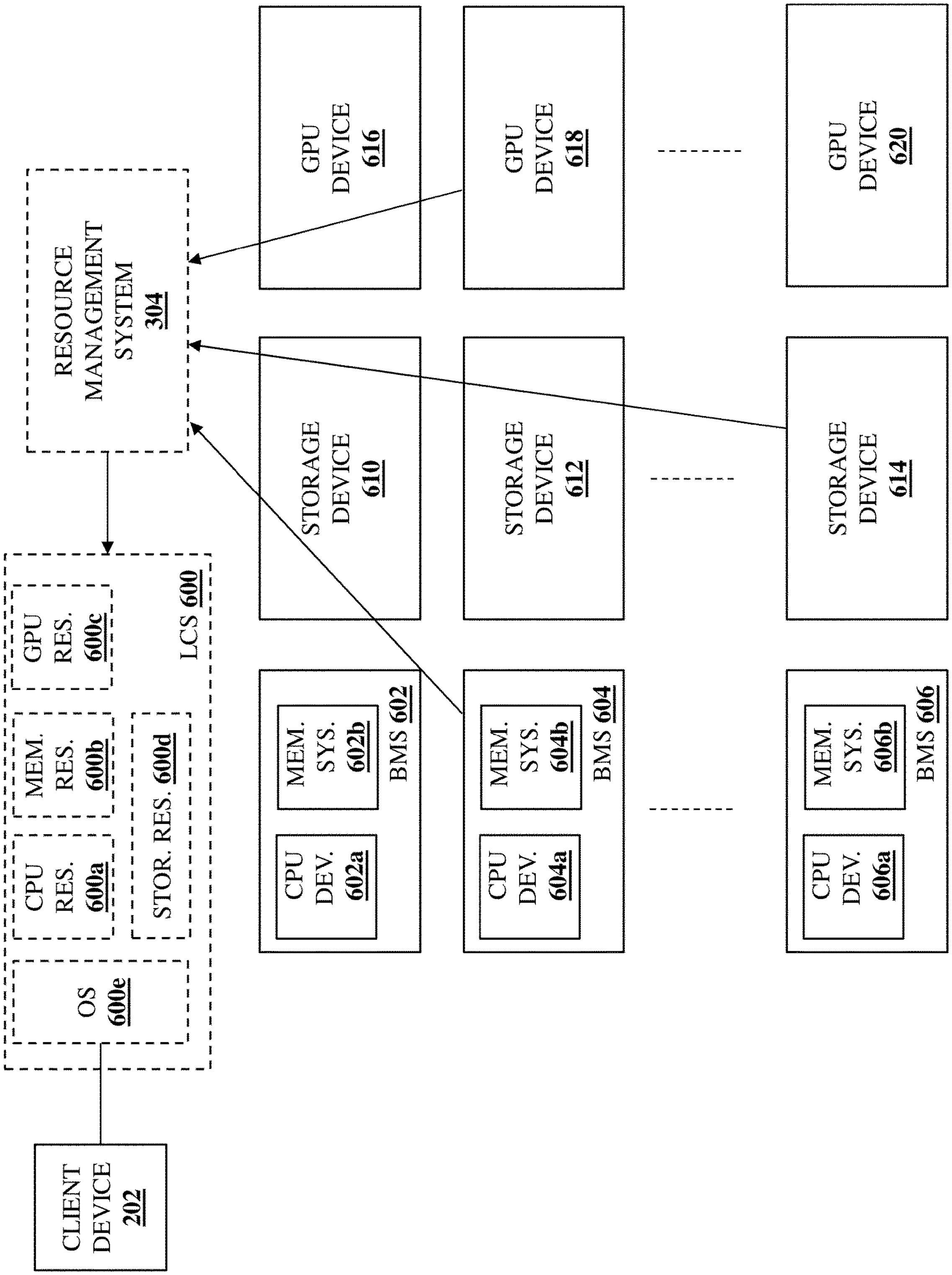
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

However, as discussed above, microvisors that are provided on server devices (e.g., the BMSs discussed above) and/or other resource systems to connect resource devices and/or other targets to an LCS raises some issues, as conventional LCS provisioning systems require the microvisor to carry corresponding driver stacks or other initiator stacks for any targets that will be connected to the LCS, and one of skill in the art in possession of the present disclosure will appreciate how the disaggregated/composed system architectures used to provide LCSs allow a wide variety of resource devices and/or other targets to be connected to and used by those LCSs, resulting in a relatively large target driver/initiator stack footprint for the microvisor. As described below, the inventors of the present disclosure have developed the LCS microvisor target driver stack offload systems and methods of the present disclosure in order to minimize the target driver/initiator stack footprint of the microvisor by offloading target driver stacks and/or other target initiator stacks from the microvisor/BMS/resource system described herein to the SCP device/resource management system described herein.

Figure 7:
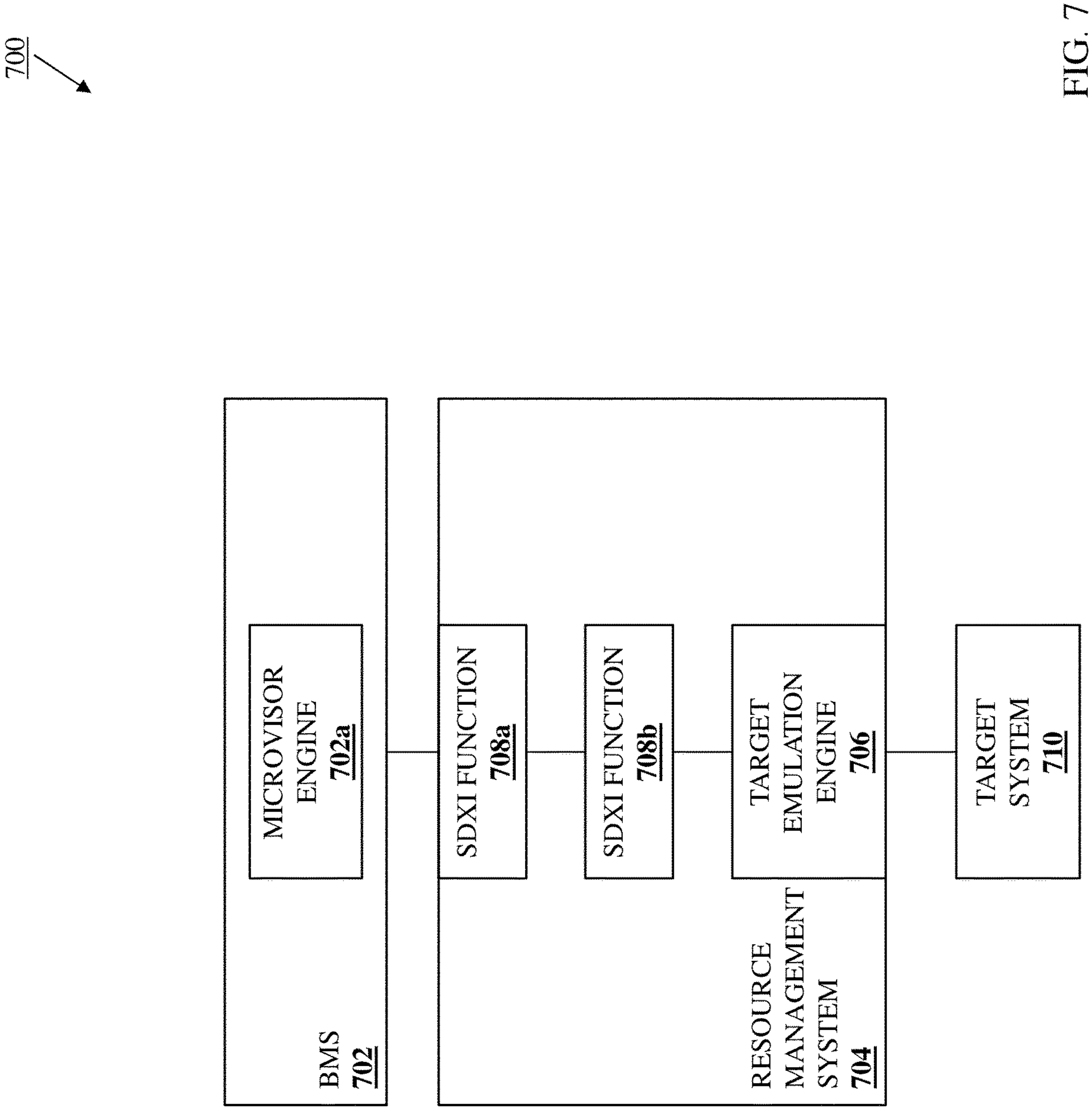
FIG. 7 is a schematic view illustrating an embodiment of an LCS provisioning system that may provide the LCS microvisor target driver stack offload system of the present disclosure.

Referring now to FIG. 7, an embodiment of a LCS provisioning system 700 is illustrated that may provide the LCS microvisor target driver stack offload system of the present disclosure. In the illustrated embodiment, the LCS provisioning system 700 includes a BMS 702. In an embodiment, the BMSs may be provided by the IHS 100 discussed above with reference to FIG. 1, and/or may include some or all of the components of the IHS 100, and in specific examples may be provided by any of the BMSs 602, 604, and 606 discussed above with reference to FIG. 6. However, while illustrated and discussed as being provided by a BMS 702, one of skill in the art in possession of the present disclosure will recognize that the BMS 702 in the LCS provisioning system 700 may be replaced by any of the resource systems 306*a*-306*c* discussed above with reference to FIG. 3, the resource system 400 discussed above with reference to FIG. 4, and/or other resource systems that would be apparent to one of skill in the art in possession of the present disclosure.

In the illustrated embodiment, the BMS 702 includes a BMS memory system (e.g., any of the memory systems 602*b*, 604*b*, and 606*b* discussed above with reference to FIG. 6) having instructions that, when executed by a BMS processing system (e.g., any of the CPU devices 602*a*, 604*a*, and 606*a* discussed above with reference to FIG. 6) in the BMS 702, cause that BMS processing system to provide a microvisor engine 702*a* that is configured to perform the functionality of the microvisor engines, microvisor subsystems, and/or BMSs described below. As will be appreciated by one of skill in the art in possession of the present disclosure, the LCS microvisor target driver stack offload system of the present disclosure eliminates the need for the microvisor engine 702*a* and BMS 702 to store or utilize driver stacks or other initiator stacks for the target systems described below, thus minimizing the target driver/initiator stack footprint of the microvisor engine 702*a* and any corresponding overhead and/or target driver/initiator stack "bloat" that can occur in conventional LCS provisioning systems.

In the illustrated embodiment, the LCS provisioning system 700 also includes a resource management system 704 that is coupled to the BMS 702 and that may be provided by the resource management system 304 discussed above with reference to FIG. 3 and/or the SCP devices discussed above. In the illustrated embodiment, the resource management system 704 includes a resource management memory system (e.g., one or more memory devices) having instructions that, when executed by a resource management processing system (e.g., one or more processor devices) in the resource management system 704, cause that resource management processing system to provide a target emulation engine 706 that is configured to perform the target emulation operations of the target emulation engines, target emulation subsystems, or resource management systems described below. As described below, the target emulation engine 706 may be configured with a target emulation memory address space provided by memory device(s) that are used by the target emulation engine 706. As will be appreciated by one of skill in the art in possession of the present disclosure, the LCS microvisor target driver stack offload system of the present disclosure uses the target emulation engine 706 and resource management system 704 to store or utilize driver stacks or other initiator stacks for the target systems described below, thus offloading those driver stacks or other target-system-specific initiator stacks from the microvisor engine 702*a* in the BMS 702.

The resource management memory system in the resource management system 704 also includes instructions that, when executed by the resource management processing system, cause that resource management processing system to provide a "microvisor-facing" Smart Data Accelerator Interface (SDXI) function 708*a* that is coupled to the BMS 702 and configured to communicate with the microvisor engine 702*a* provided by the BMS 702, and a "target-emulator-facing" Smart Data Accelerator Interface (SDXI) function 708*b* that is configured to communicate with the SDXI function 708*a* and the target emulation engine 706. As will be appreciated by one of skill in the art in possession of the present disclosure, the SDXI functions 708*a* and 708*b* may be "generic" or otherwise conventional SDXI functions (e.g., PCIe, CXL, or other hardware-based functions known in the art, software/emulated functions, etc.) that are configured to perform memory-to-memory data mover functionality and/or other generic or otherwise conventional SDXI functionality known in the art, with any protocol handling functionality (e.g., the NVMe protocol handling functionality described below) performed by the other (non-SDXI function) components of the LCS microvisor target driver stack offload system of the present disclosure.

In the illustrated embodiment, the LCS provisioning system 700 also includes a target system 710 that is coupled to the resource management system 704 and that is configured to communicate with the target emulation engine 706. In the examples provided below, the target system 710 is described as being provided by an NVMe device (e.g., an NVMe storage device) or a file system, but one of skill in the art in possession of the present disclosure will appreciate how the target system 710 may be provided by any of a variety of resource devices (e.g., Serial AT Attachment (SATA) devices, etc.) that may be utilized by an LCS as described above. However, while a specific LCS provisioning system 700 has been illustrated and described, one of skill in the art in possession of the present disclosure will recognize that the LCS microvisor target driver stack offload system of the present disclosure may include a variety of components and component configurations while remaining within the scope of the present disclosure as well.

Figure 8:
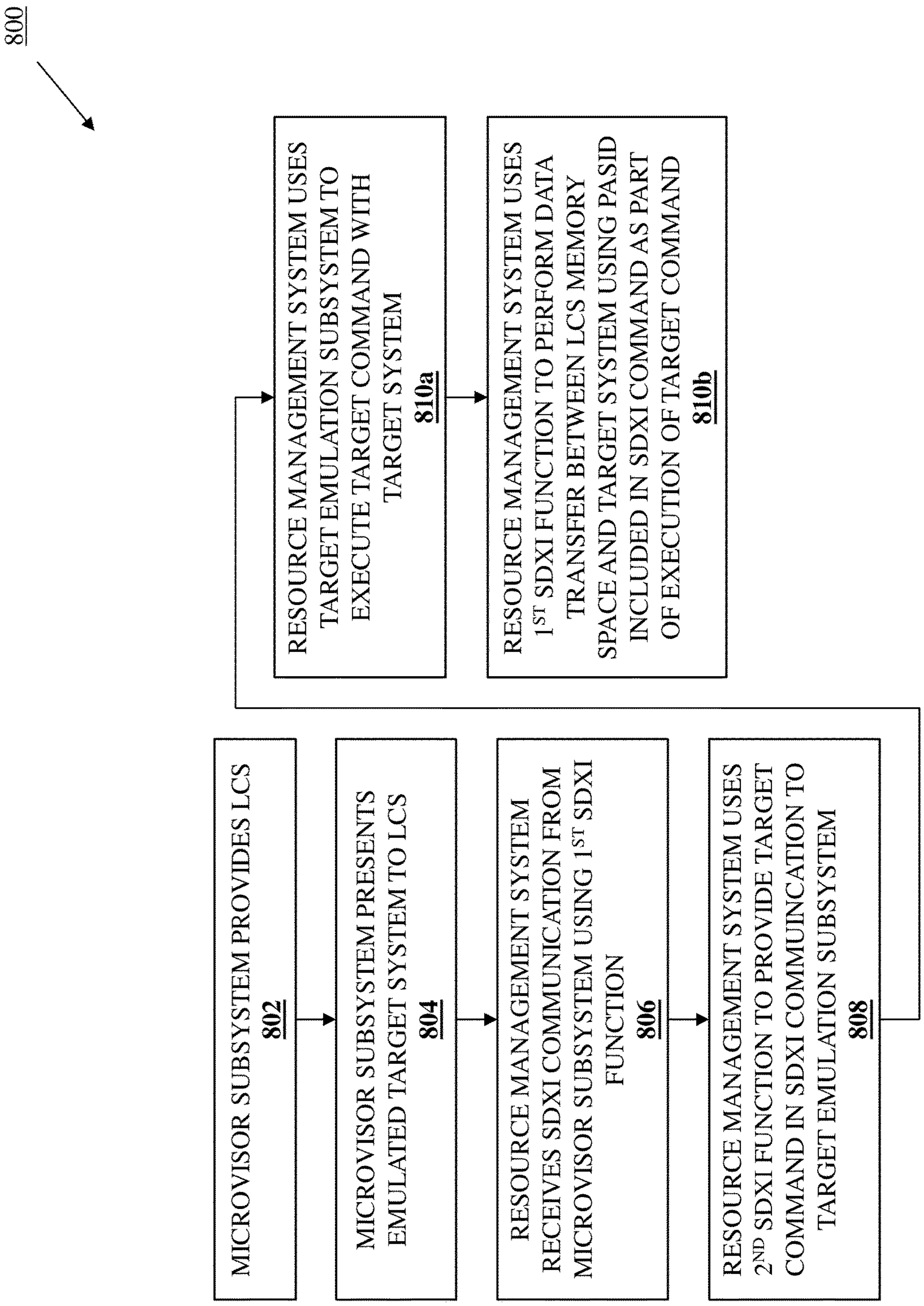
FIG. 8 is a flow chart illustrating an embodiment of a method for offloading a target driver stack from a microvisor providing an LCS.

Referring now to FIG. 8, an embodiment of a method 800 for offloading a target driver stack from a microvisor providing a Logically Composed System (LCS) is illustrated. As discussed below, the systems and methods of the present disclosure offload target driver stacks from microvisors on server devices (or other resource systems) that provide LCSs, to target emulation subsystems in an SCP device (or other resource management system). For example, the LCS microvisor target driver stack offload system of the present disclosure may include a resource management system coupled to a target system and to a server device including a microvisor subsystem that provides an LCS having an LCS memory address space that does not include a target driver stack for the target system. The resource management system receives an SDXI communication from the microvisor subsystem using a first SDXI function, and uses a second SDXI function to provide a target command in the SDXI communication to a target emulation subsystem including the target driver stack for the target system. The resource management system then uses the target emulation subsystem to execute the target command with the target system and, as part of the target command execution, uses the first SDXI function to perform a data transfer between the LCS memory address space and the target system using a Process Address Space IDentifier (PASID) that is accessible using the SDXI communication. As such, the target driver stack footprints of microvisors and their server devices/resource systems may be minimized via an abstraction implemented (e.g., via Application Programming Interfaces (APIs)) using SDXI functions in SCP devices/resource management systems.

Figure 9:
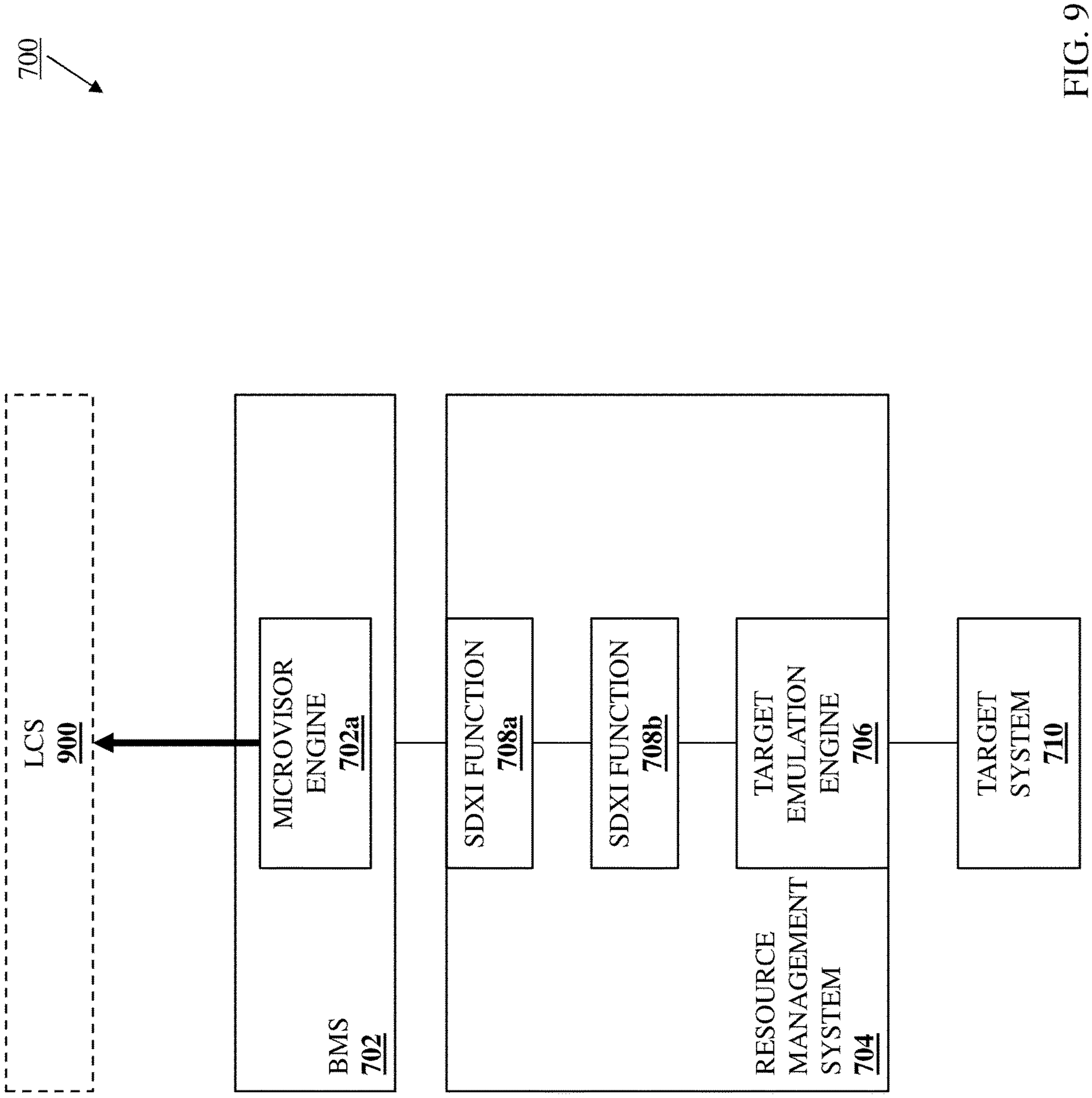
FIG. 9 is a schematic view illustrating an embodiment of the operation of the LCS provisioning system of FIG. 7 operating during the method of FIG. 8.

The method 800 begins at block 802 where a microvisor subsystem provides an LCS. With reference to FIG. 9, in an embodiment of block 802, the microvisor engine 702*a* in the BMS 702 may provide an LCS 900. For example, similarly as described above, the resource management system 704 may receive a workload intent from a client device and, in response, may compose the LCS 900 using the BMS 702 by, for example, configuring the microvisor engine 702*a* to provide the LCS 900 using any of a variety or resource devices included in the BMS 702 and/or located outside of the BMS 702. As such, the LCS 900 may be provided with a LCS memory address space using a memory system in the BMS 702, as well as memory systems outside the BMS 702 in some embodiments. However, while a specific example is provided, one of skill in the art in possession of the present disclosure will appreciate how the microvisor engine 702*a* may provide the LCS 900 using a variety of LCS provisioning techniques that will fall within the scope of the present disclosure as well.

Figure 10:
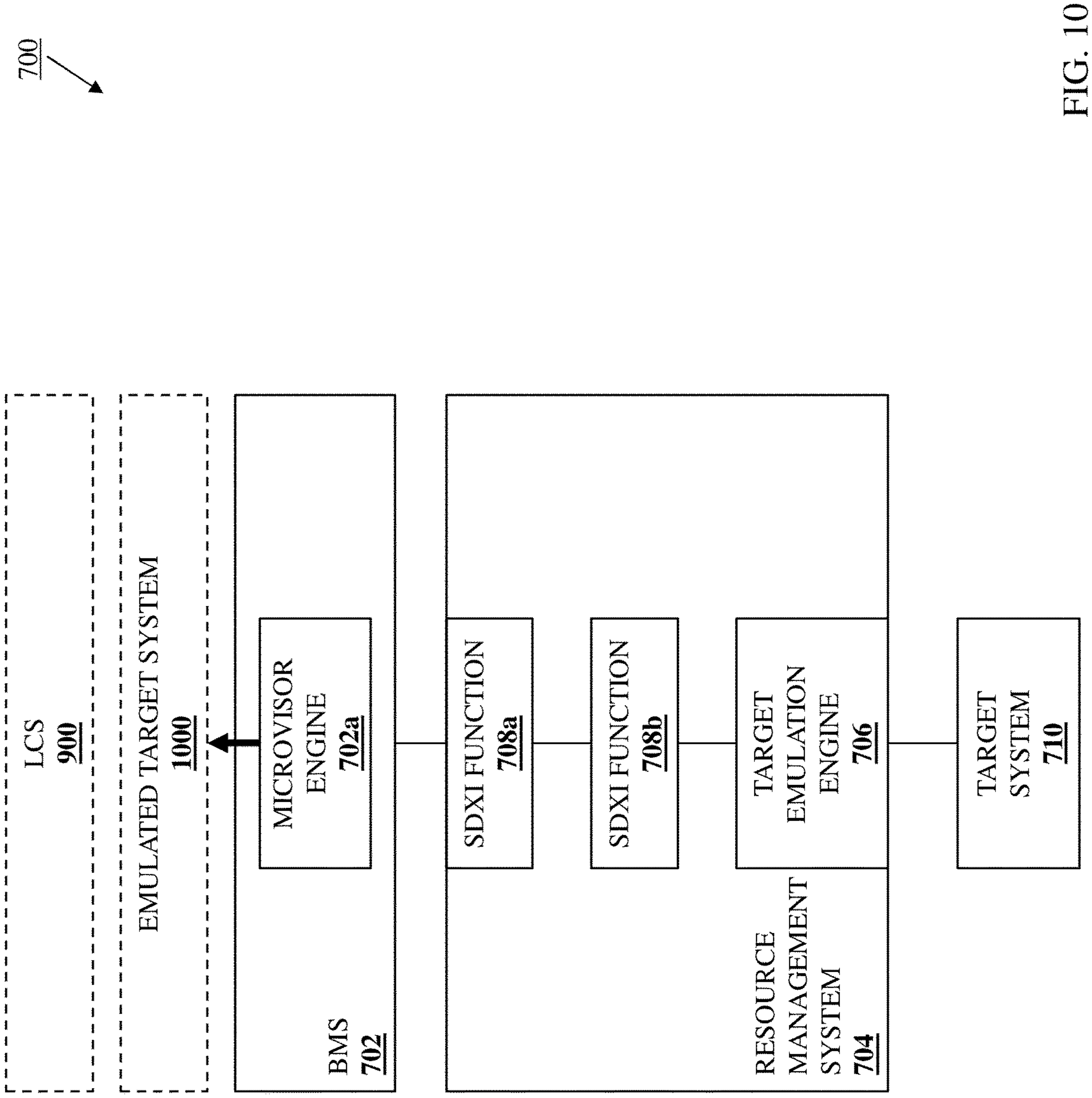
FIG. 10 is a schematic view illustrating an embodiment of the operation of the LCS provisioning system of FIG. 7 operating during the method of FIG. 8.

The method 800 then proceeds to block 804 where the microvisor subsystem presents an emulated target system to the LCS. With reference to FIG. 10, in an embodiment of block 804, the microvisor engine 702*a* in the BMS 702 may present an emulated target system 1000 to the LCS 900. For example, and as will be appreciated by one of skill in the art in possession of the present disclosure, the target system 710 may be one of the resource devices discussed above that the resource management system 704 may have configured the microvisor engine 702*a* to use in providing the LCS 900. As such, one of skill in the art in possession of the present disclosure will appreciate how the microvisor engine 702*a* may be configured to present the emulated target system 1000 to the LCS 900 in order to allow the LCS 900 to use the target system 710 during its operation.

In an embodiment and as part of the provisioning of the LCS 900 at block 802 and/or the presentment of the emulated target system 1000 to the LCS 900 at block 804, the microvisor engine 702*a* in the BMS 702 may allocate a Process Address Space IDentifier (PASID) to the LCS 900, and may provide that PASID to the SDXI function 708*a* in the resource management system 704 which, as discussed below, allows the resource management system 704 to use an I/O Memory Management Unit (IOMMU) to access the LCS memory address space of the LCS 900. As will be appreciated by one of skill in the art in possession of the present disclosure, the PASIDs discussed below may be allocated per-LCS, and thus each LCS provided by BMS(s) in the LCS microvisor target driver stack offload system may be allocated a unique PASID that may be used similarly as the PASID that is described below as being uniquely allocated to the LCS 900 and used to access the LCS memory space of the LCS 900.

Figure 11:
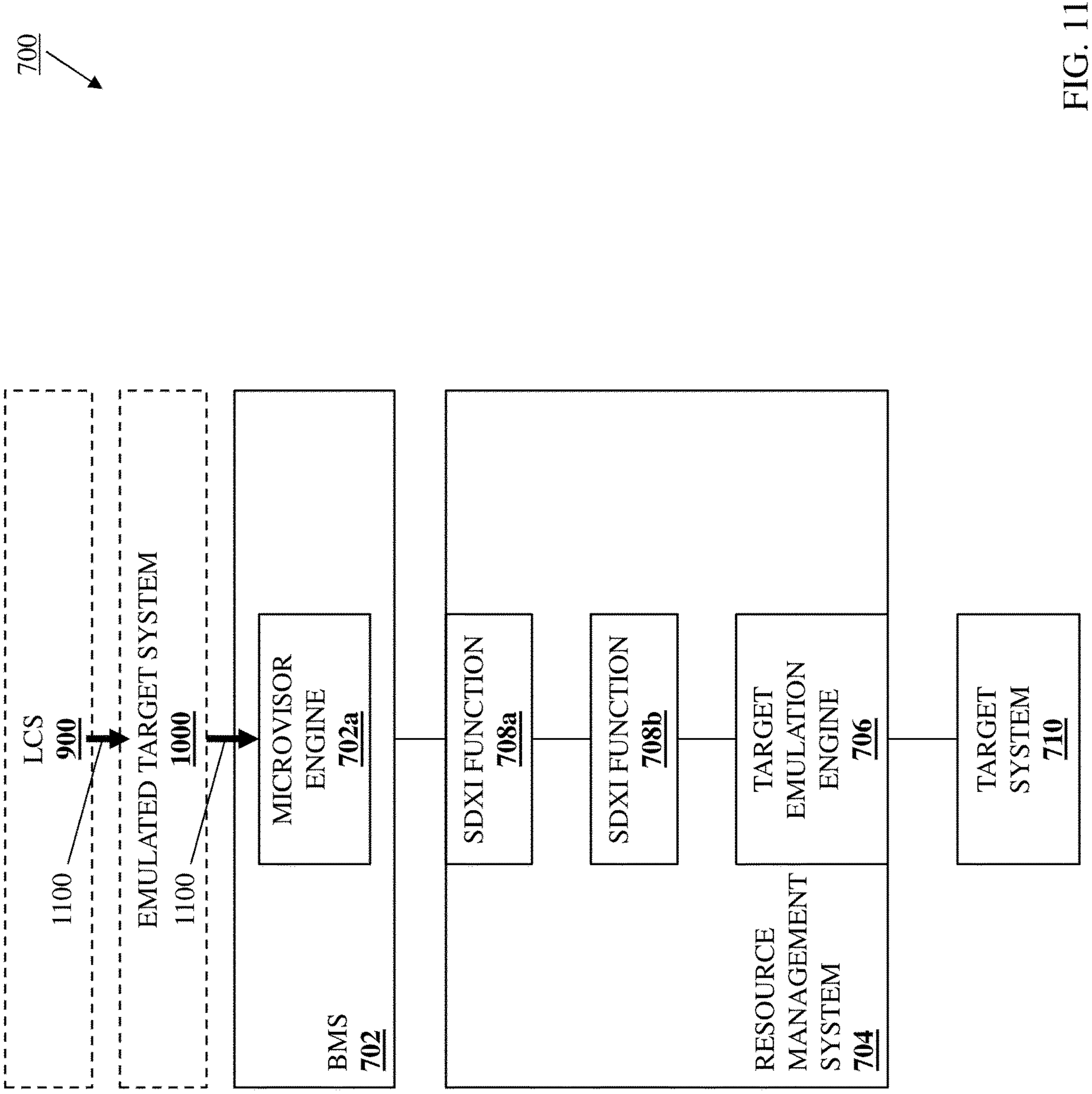
FIG. 11 is a schematic view illustrating an embodiment of the operation of the LCS provisioning system of FIG. 7 operating during the method of FIG. 8.

The method 800 then proceeds to block 806 where a resource management system receives an SDXI communication from the microvisor subsystem using a first SDXI function. With reference to FIG. 11, in an embodiment of block 806, the LCS 900 may perform target command provisioning operations 1100 that may include generating and transmitting a target command to the emulated target system 1000, which one of skill in the art in possession of the present disclosure will recognize may cause the microvisor engine 702*a* in the BMS 702 that is providing the emulated target system 1000 to receive that target command. For example, target command provisioning operations 1100 may include the LCS 900 writing the target command to a microvisor memory address space used by the microvisor engine 702*a* and "ringing a doorbell" of the microvisor engine 702*a*, although other target command provisioning operations (e.g., the microvisor engine 702*a* monitoring a write to a doorbell register in the LCS memory address space of the LCS 900 by "trapping" that write, emulating a doorbell register in the microvisor memory address space for the LCS 900, etc.) will fall within the scope of the present disclosure as well. In the specific examples provided below, the target command is an NVMe device or file system read or write command, but one of skill in the art in possession of the present disclosure in the art in possession of the present disclosure will appreciate how other types of target commands (e.g., SATA device commands, etc.) for other types of target systems will fall within the scope of the present disclosure.

Figure 12:
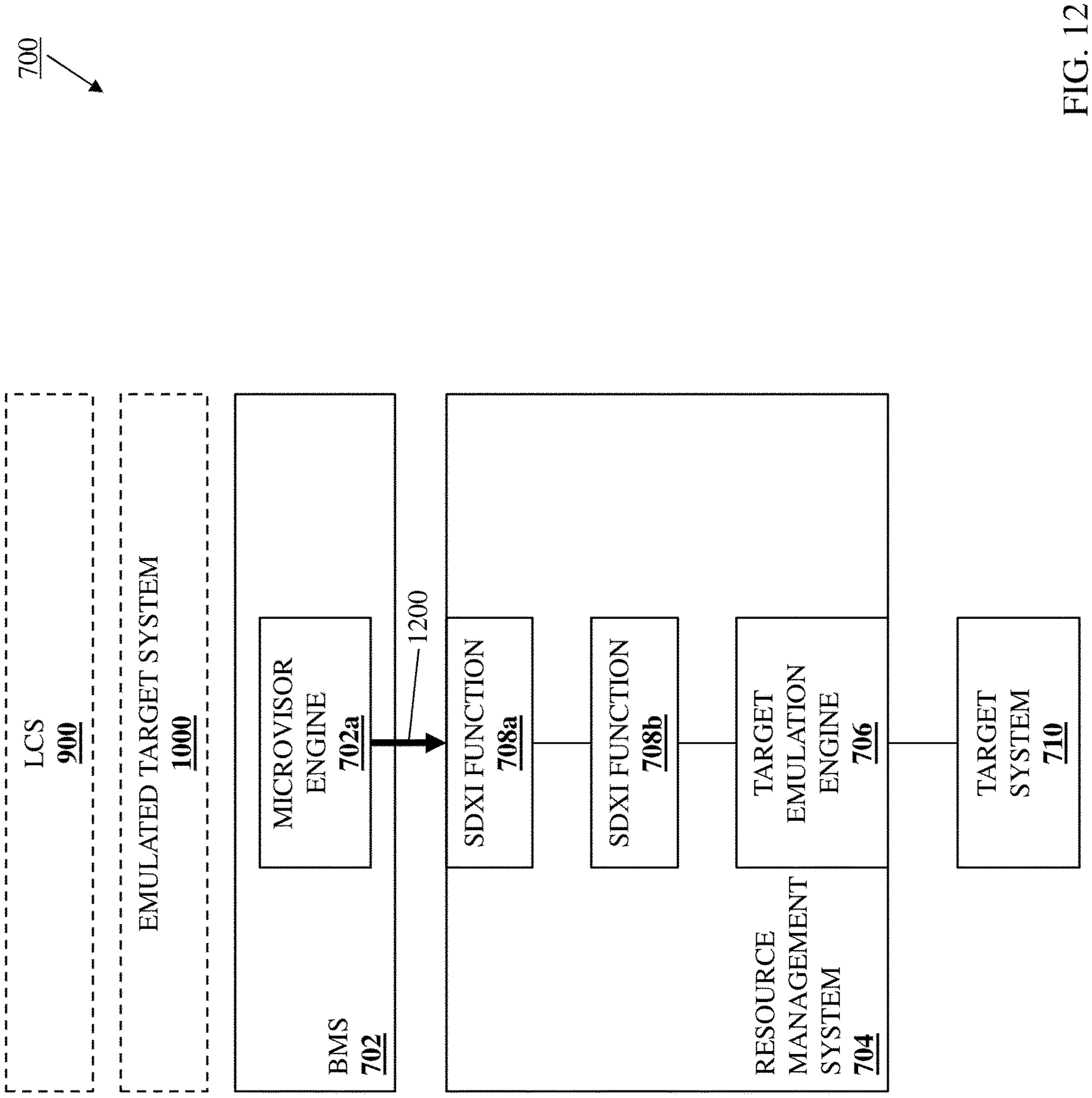
FIG. 12 is a schematic view illustrating an embodiment of the operation of the LCS provisioning system of FIG. 7 operating during the method of FIG. 8.

With reference to FIG. 12, at block 806 and in response to receiving the target command, the microvisor engine 702*a* in the BMS 702 may perform target SDXI communication provisioning operations 1200 that may include generating an SDXI communication for the target command received from the LCS 900, and transmitting that SDXI command to the SDXI function 708*a* provided by the resource management system 704. For example, in response to receiving the target command from the LCS 900, the microvisor engine 702*a* may generate an SDXI communication that includes an SDXI descriptor that identifies the target command in the microvisor memory address space of the microvisor engine 702*a* (or in the LCS memory address space of the LCS 900), and that may include any other SDXI communication information that one of skill in the art in possession of the present disclosure would recognize as enabling the functionality described below.

Figure 13A:
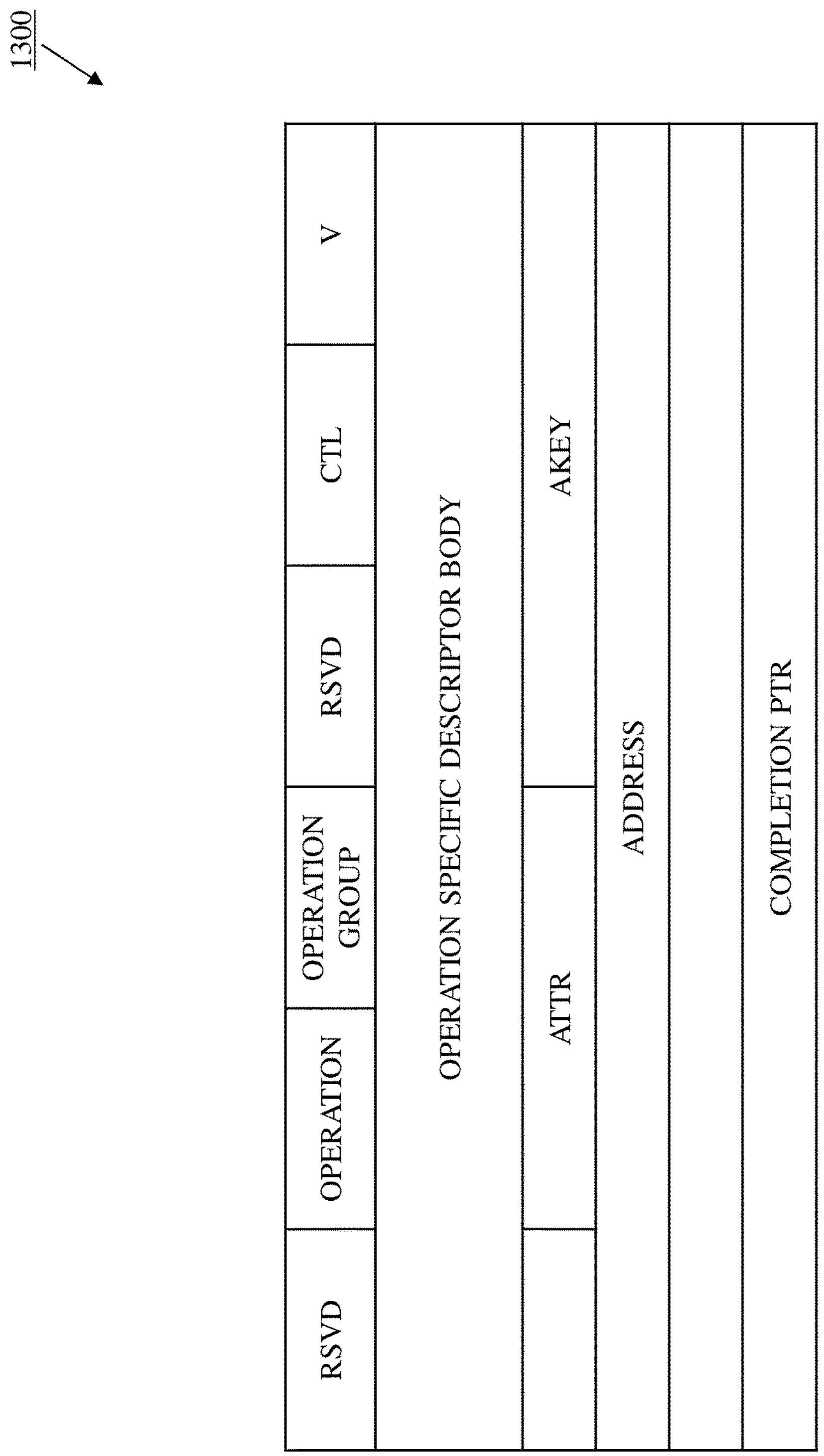
FIG. 13A is a schematic view illustrating an embodiment of an SDXI communication used by the LCS provisioning system of FIG. 7 operating during the method of FIG. 8.
Figure 13B:
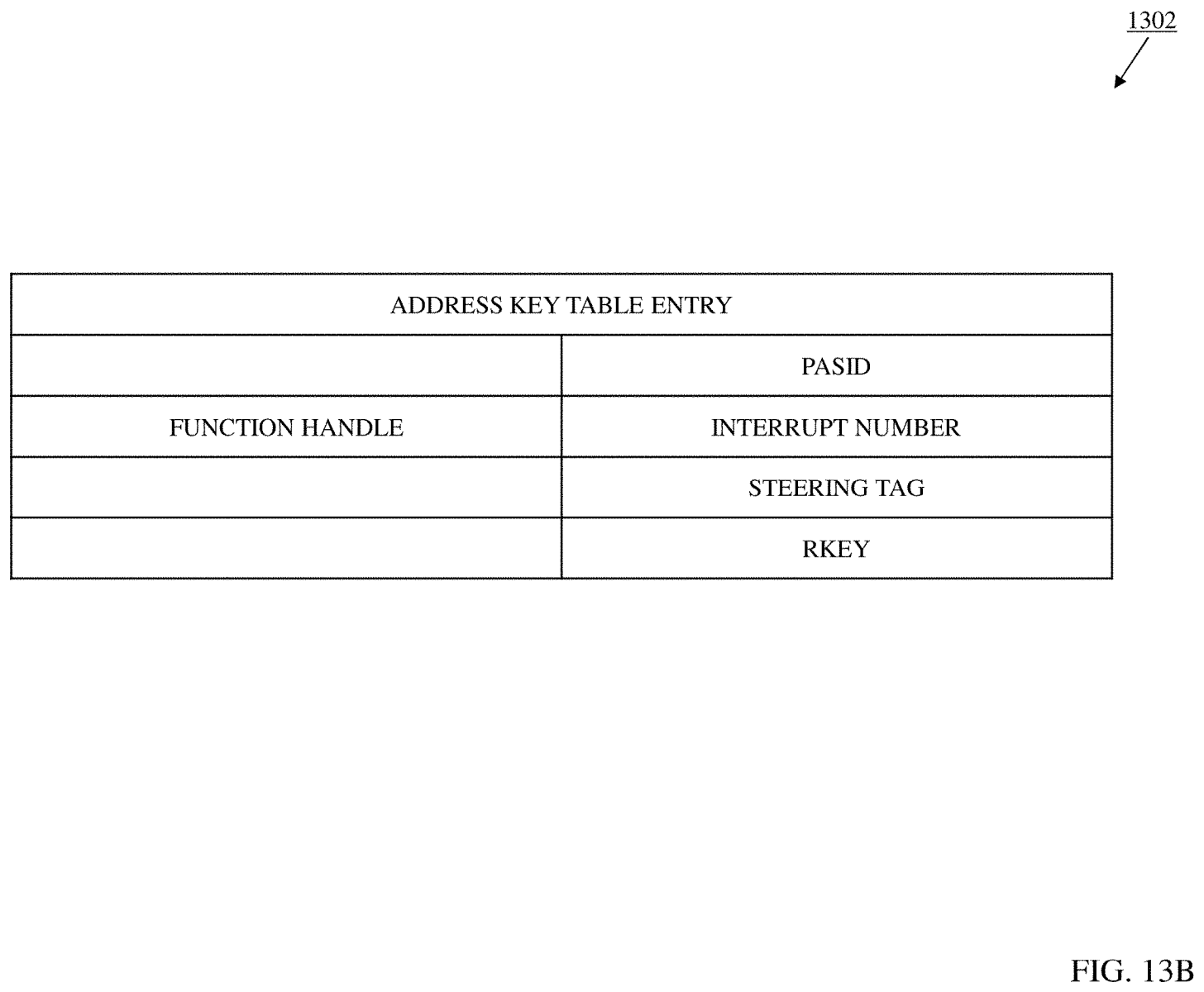

With reference to FIG. 13A, a specific example of the SDXI communication 1300 generated and transmitted to the SDXI function 708*a* at block 806 is illustrated. As will be appreciated by one of skill in the art in possession of the present disclosure, the SDXI communication 1300 illustrated in FIG. 13A includes an SDXI descriptor that may be provided in an SDXI descriptor ring and that includes an SDXI descriptor format that is configured to identify memory location(s) in a memory address space using an OPERATION SPECIFIC DESCRIPTOR BODY field that includes a cacheability ATTRibutes ("ATTR") field, an Address KEY ("AKEY") field, and a 64-bit ADDRESS field. Furthermore, with reference to FIG. 13B, an embodiment of an ADDRESS KEY TABLE ENTRY 1302 is illustrated that may be accessible by the SDXI function 708*a* using an AKEY provided in the AKEY field of the SDXI descriptor in the SDXI communication 1300, and that includes a Process Address Space IDentifier ("PASID") field that may store a PASID assigned to an LCS as described above.

In a specific example, the SDXI descriptors described above may be extended to include a target profile for intended data movement. For example, such target profiles may be provided as vendor-specific SDXI operations that, once run (e.g., prior to LCS provisioning), optimize each data operation for the target profile. In another example, such target profiles may be provided as an extension to SDXI operations via the use of a specific operation code ("opcode") encoding in the SDXI descriptor that allow the microvisor engine 702*a* to mix and match different target profiles for different LCS data transfers on a per-SDXI-descriptor basis.

As such, one of skill in the art in possession of the present disclosure will appreciate how the SDXI communication 1300 generated by the microvisor engine 702*a* at block 806 may include an identification of the target command in the microvisor memory address space of the microvisor engine 702*a* using AKEY in the AKEY field included in its OPERATION SPECIFIC DESCRIPTOR BODY field that references the ADDRESS KEY TABLE ENTRY 1302 that includes the PASID in its PASID field that was allocated to the LCS 900 as described above, as well as other information that one of skill in the art in possession of the present disclosure would appreciate is required to access the microvisor memory space of the microvisor engine 702*a*.

Figure 14:
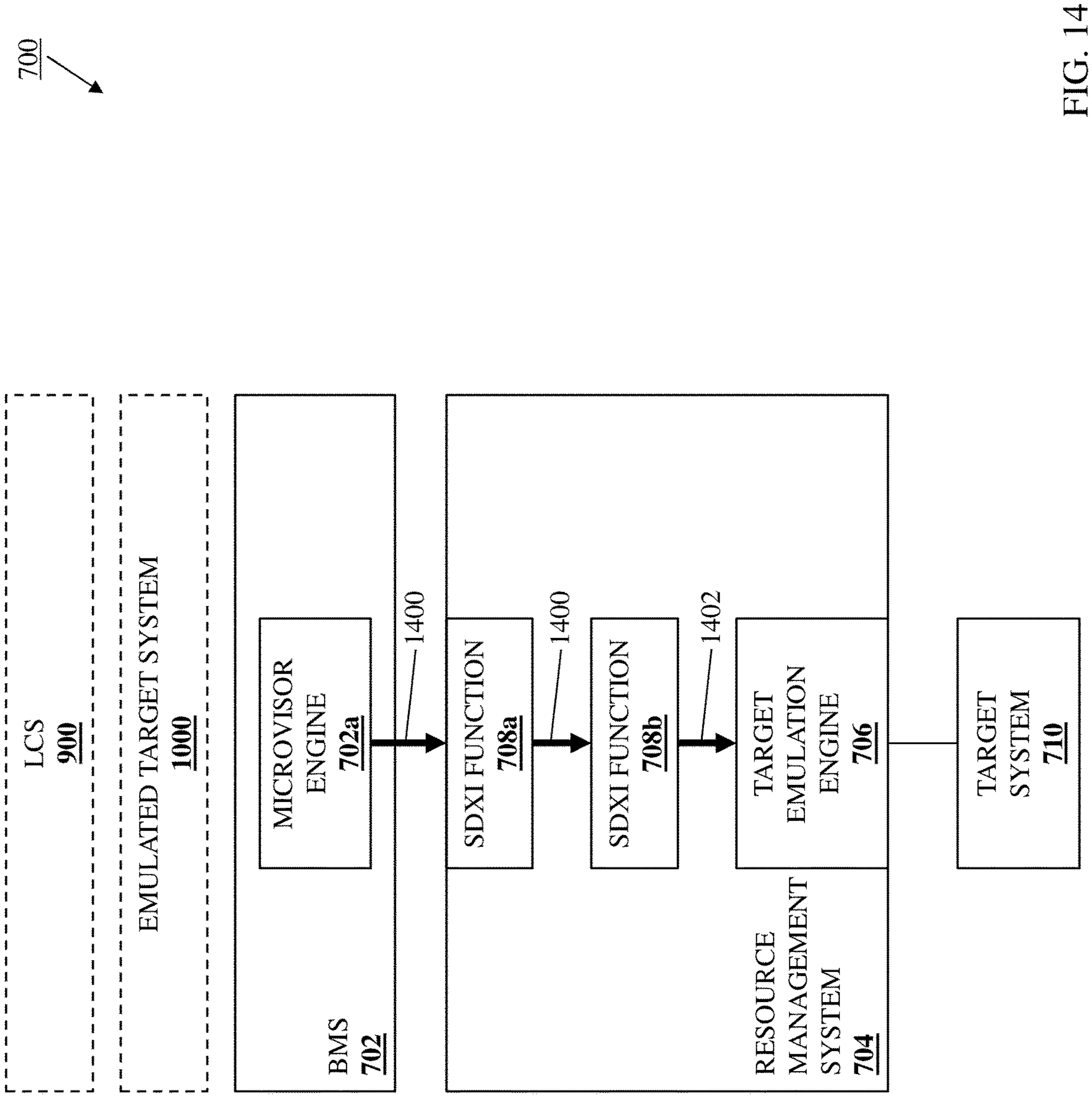
FIG. 14 is a schematic view illustrating an embodiment of the operation of the LCS provisioning system of FIG. 7 operating during the method of FIG. 8.

The method 800 then proceeds to block 808 where the resource management system uses a second SDXI function to provide a target command in the SDXI communication to a target emulation subsystem. With reference to FIG. 14, in an embodiment of block 808, the SDXI function 708*a* in the resource management system 704 may perform target command provisioning operations 1400 that include retrieving the target command from the microvisor memory address space of the microvisor engine 702*a*, and providing that target command to the SDXI function 708*b*. For example, the SDXI function 708*a* may use the AKEY in the AKEY field included in its OPERATION SPECIFIC DESCRIPTOR BODY field of the SDXI descriptor provided by the SDXI communication 1300 discussed above to retrieve the target command from the microvisor memory address space of the microvisor engine 702*a*, and may provide that target command to the SDXI function 708*b*.

To provide an example of the target command provisioning operations 1400, each memory address space may be associated with a respective AKEY, with the target emulation memory space associated with a respective AKEY, and the microvisor memory address space and LCS memory address space each associated with a respective AKEY and respective PASID. Continuing with this specific example, data may be moved from the LCS memory address space of the LCS 900 to the target emulation memory address space of the target emulation engine 706, with the SDXI descriptor ring provided in the microvisor memory address space of the microvisor engine 702*a* and including a source AKEY, a destination AKEY, a source address, a destination address, and other information. The microvisor engine 702*a* may construct a memory descriptor to move the data from the LCS memory address space to the target emulation memory address space, and that descriptor may identify each of: the operation as an SDXI "memcpy" operation, the AKEY of the LCS 900 as the source AKEY, the buffer address of the LCS 900 as the source address, the AKEY of the target emulation engine 706 as the destination AKEY, and the buffer address of the target emulation engine 706 as the destination address.

Once the memory descriptor is constructed by the microvisor engine 702*a*, the microvisor engine 702*a* may enqueue the memory descriptor in the SDXI descriptor ring in the microvisor memory address space. The SDXI function 708*a* can proactively read the SDXI descriptor from the microvisor memory address space using a "context" PASID that is provided for the microvisor memory address space that hosts the SDXI descriptor ring. Once the SDXI descriptor is read, the SDXI function 708*a* may read data at the source address (the buffer address of the LCS 900) from the LCS memory address space using the PASID for the LCS 900, and provide that data to the SDXI function 708*b*.

As also illustrated in FIG. 14, the SDXI function 708*b* may then perform target command forwarding operations 1402 to forward that target command to the target emulation engine 706, and one of skill in the art in possession of the present disclosure will appreciate how the target command forwarding operations 1402 performed by the SDXI function 708*b* may utilize similar SDXI techniques as those described above (e.g., the SDXI function 708*b* may write that data to the target emulation engine memory address space using the PASID for the target emulation engine 706) while remaining within the scope of the present disclosure. However, while described as being accessed via a PASID, one of skill in the art in possession of the present disclosure will appreciate how a PASID may not be necessary to access the target emulation memory address space for the target emulation engine 706 if the resource management memory address space of the resource management system 704 (e.g., the SCP memory address space of an SCP device) is not split or otherwise shared by different LCSs, or "walled off" to isolate resources in the provided for an LCS.

However, while a specific example of the use of the microvisor engine 702*a* to transmit the target command from the LCS 900 to the target emulation engine 706 has been described, one of skill in the art in possession of the present disclosure will appreciate how the target command transmissions from the LCSs to the target emulation engines of the present disclosure may be optimized if a memory address space is shared between an LCS and a target emulation engine. For example, if an LCS memory address space of the LCS 900 is shared with the target emulation engine 706, the LCS 900 may write the target command described above to its LCS memory address space, and the target emulation engine 706 may then enqueue a memory descriptor similarly as described above to move data between the LCS memory address space of the LCS 900 and the target emulation engine memory address space of the target emulation engine 706 (e.g., as required by the protocol command being used (e.g., an NVMe command, a SATA command, etc.)).

The method 800 then proceeds to block 810*a* and 810*b* where the resource management system uses the target emulation subsystem to execute the target command with the target system, while the resource management system uses the first SDXI function to perform a data transfer between LCS memory address space and the target system, using a PASID included in the SDXI command, as part of the execution of the target command. As will be apparent to one of skill in the art in possession of the present disclosure, blocks 810*a* and 810*b* of the method 800 provide for the execution of the target command received from the LCS 900 by the target emulation engine 706 with the target system 710 using SDXI data transfers performed by the SDXI functions 708*a* and 708*b*.

Figure 15A:
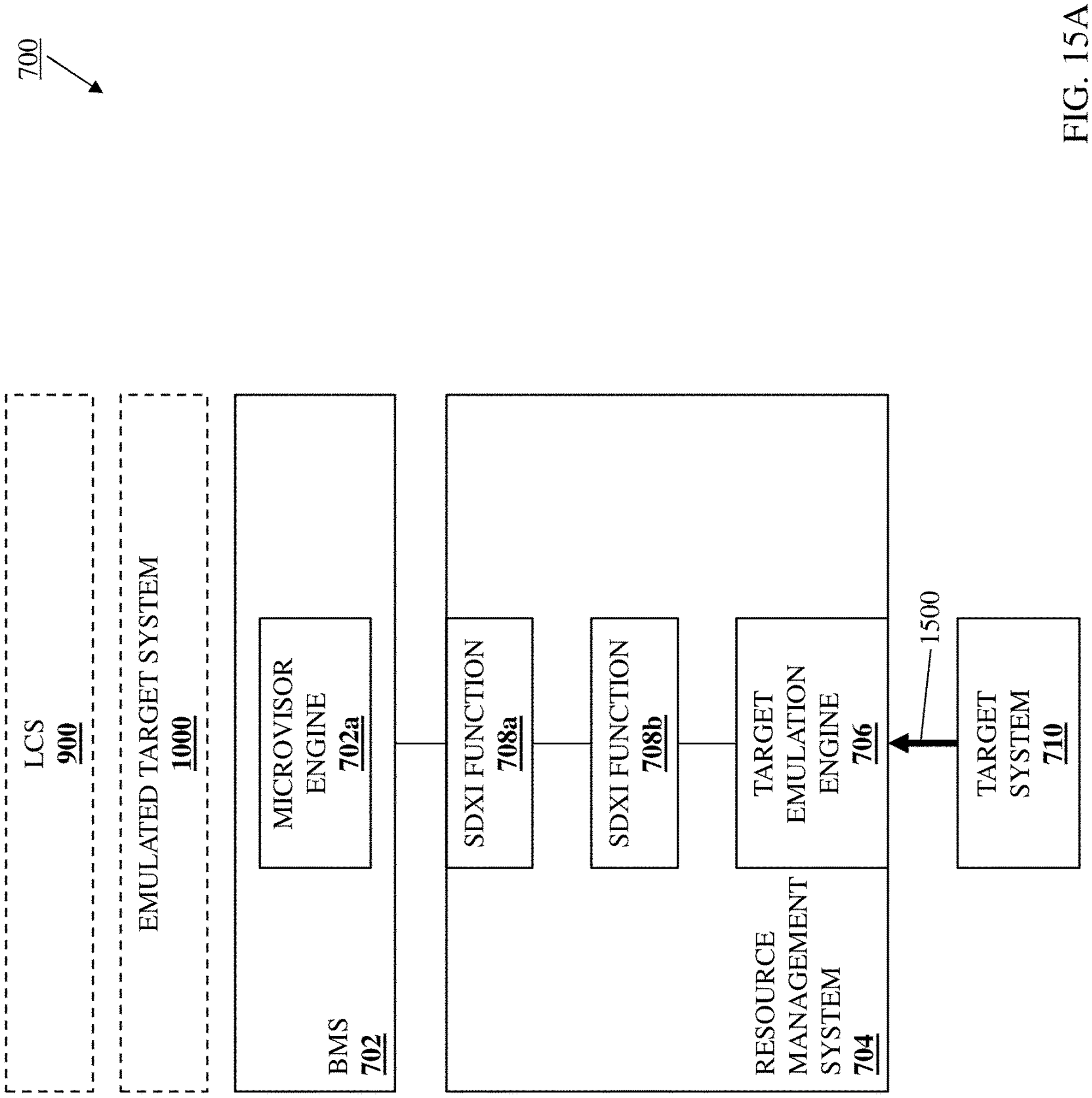
FIG. 15A is a schematic view illustrating an embodiment of the operation of the LCS provisioning system of FIG. 7 operating during the method of FIG. 8.

In a first embodiment of blocks 810*a* and 810*b*, the target command may be a data read command to read data from the target system 710 (e.g. an NVMe storage device, a file system, etc.) and provide that data to the LCS 900. As illustrated in FIG. 15A, this first embodiment of block 810*a* of the method 800 may include the target emulation engine 706 performing a data read operation 1500 to read data identified in the data read command/target command from the target system 710 using any of a variety of data read techniques that would be apparent to one of skill in the art in possession of the present disclosure, and writing that data to a target emulation memory address space of the target emulation engine 706. The target emulation engine 706 may then create an SDXI descriptor that instructs the writing of that data to the LCS memory address space as described below.

Figure 15B:
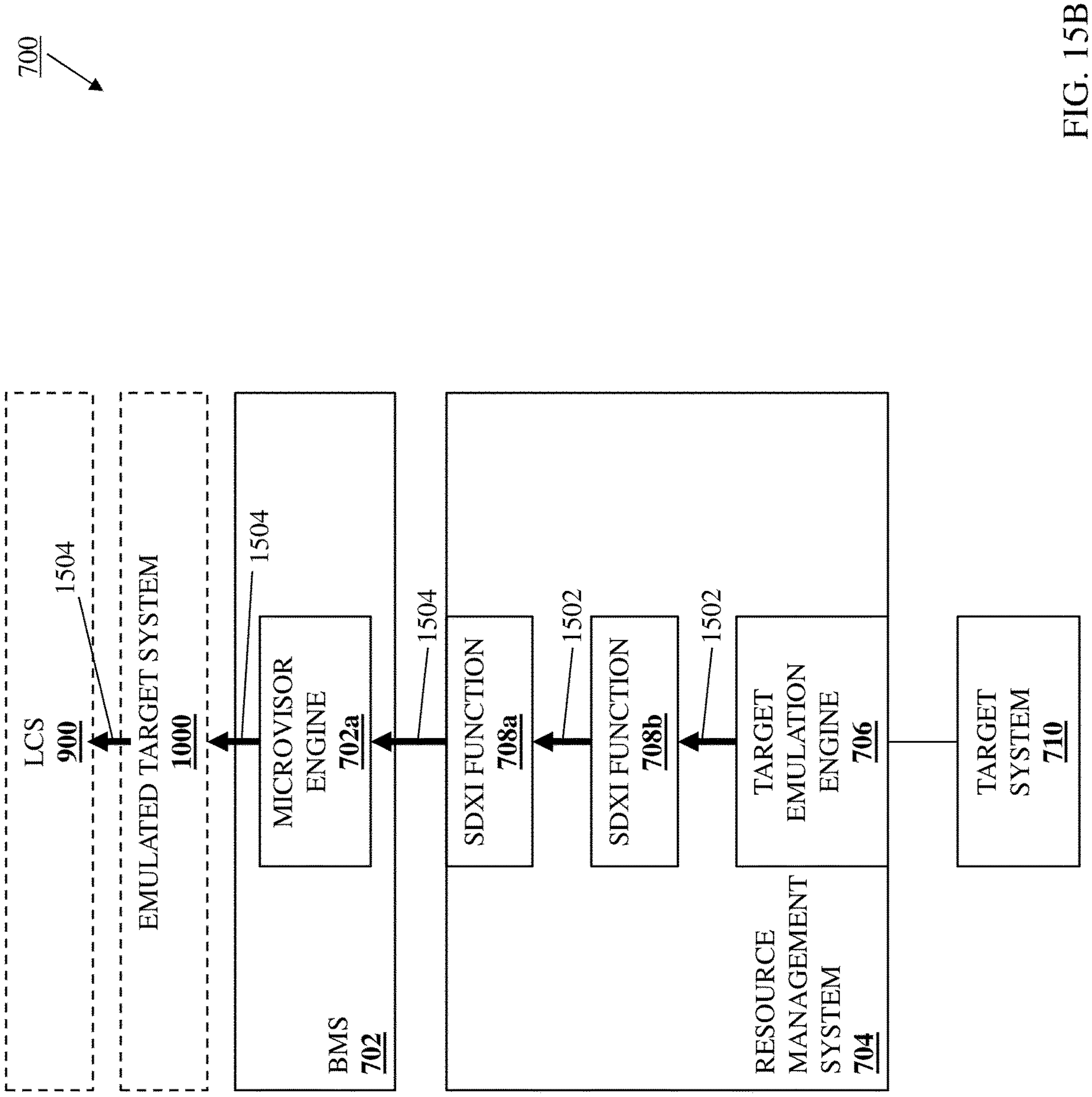
FIG. 15B is a schematic view illustrating an embodiment of the operation of the LCS provisioning system of FIG. 7 operating during the method of FIG. 8.

As illustrated in FIG. 15B, this first embodiment of block 810*b* of the method 800 may also include the SDXI function 708*b* performing a data transfer operation 1502 using the SDXI descriptor created by the target emulation engine 706 as described above, and that includes reading the data that was written to the target emulation memory address space of the target emulation engine 706 at block 810*a* (e.g., using a PASID for the target emulation memory address space similarly as described for the LCS memory space as described above, and/or using other memory address space access techniques that would be apparent to one of skill in the art in possession of the present disclosure), and providing that data to the SDXI function 708*a*. With continued reference to FIG. 15B, this first embodiment of block 810*b* of the method 800 may then include the SDXI function 708*a* performing a data transfer operation 1504 that includes writing the data that was received from the SDXI function 708*b* to the LCS memory address space of the LCS 900 using the PASID for the LCS 900, which one of skill in the art in possession of the present disclosure will appreciate completes the data read command/target command provided by the LCS 900 at block 806 (e.g., along with any data read command/target command completion messages that would be apparent to one of skill in the art in possession of the present disclosure).

Figure 16A:
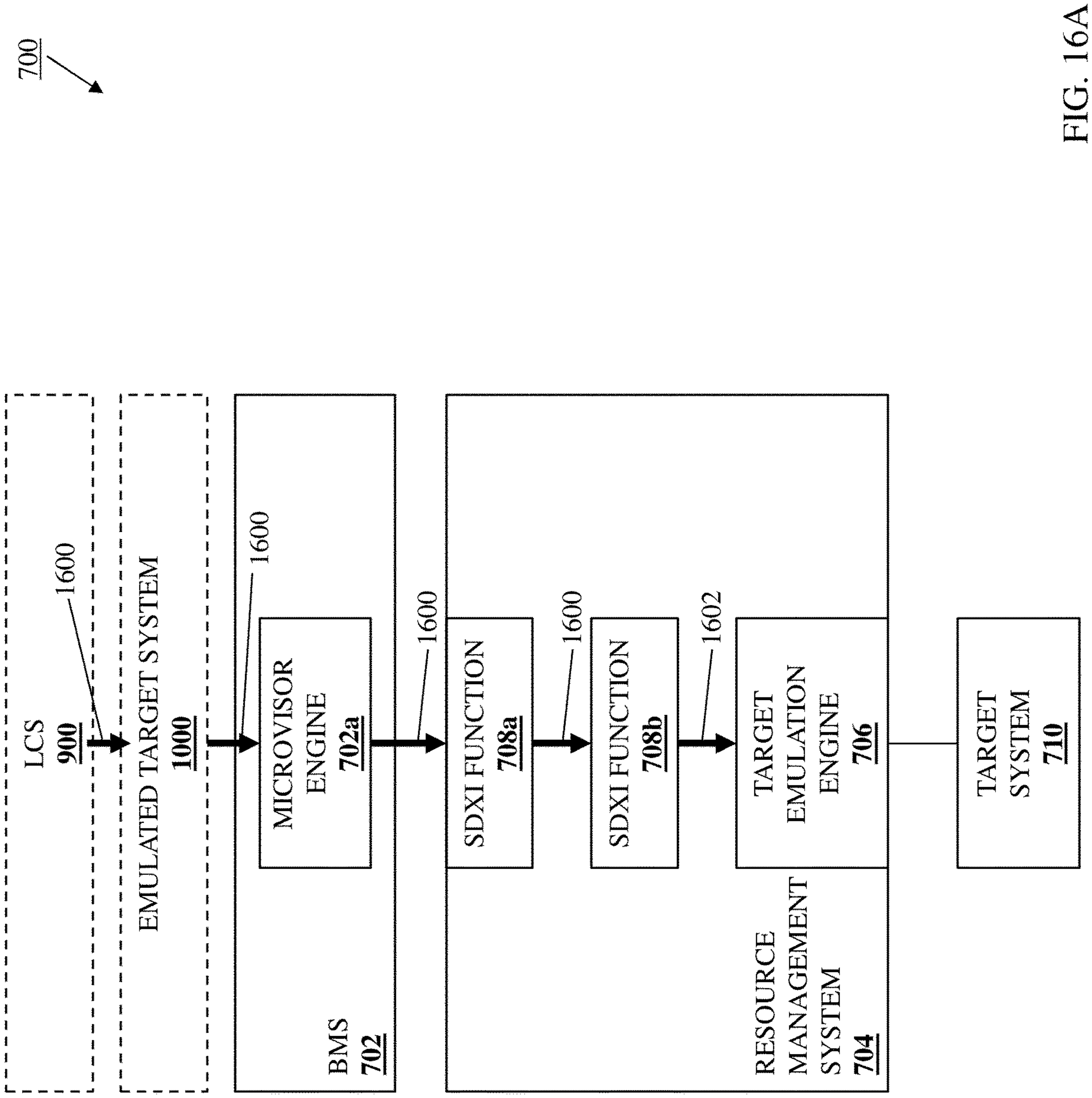
FIG. 16A is a schematic view illustrating an embodiment of the operation of the LCS provisioning system of FIG. 7 operating during the method of FIG. 8.

In a second embodiment of blocks 810*a* and 810*b*, the target command may be a data write command to write data from the LCS 900 to the target system 710 (e.g. an NVMe storage device, a file system, etc.). As illustrated in FIG. 16A, this second embodiment of block 810*b* of the method 800 may include the SDXI function 708*a* performing a data transfer operation 1600 that includes reading data that was written to the LCS memory address space of the LCS 900 at block 806 as part of the data write command/target command using the PASID for the LCS memory space as described above, and providing that data to the SDXI function 708*b*. With continued reference to FIG. 16A, this second embodiment of block 810*b* of the method 800 may then include the SDXI function 708*b* performing a data transfer operation 1602 that includes writing the data that was received from the SDXI function 708*a* to the target emulation address space of the target emulation engine 706 (e.g., using a PASID for the target emulation memory address space similarly as described for the LCS memory space as described above, and/or using other memory address space access techniques that would be apparent to one of skill in the art in possession of the present disclosure).

Figure 16B:
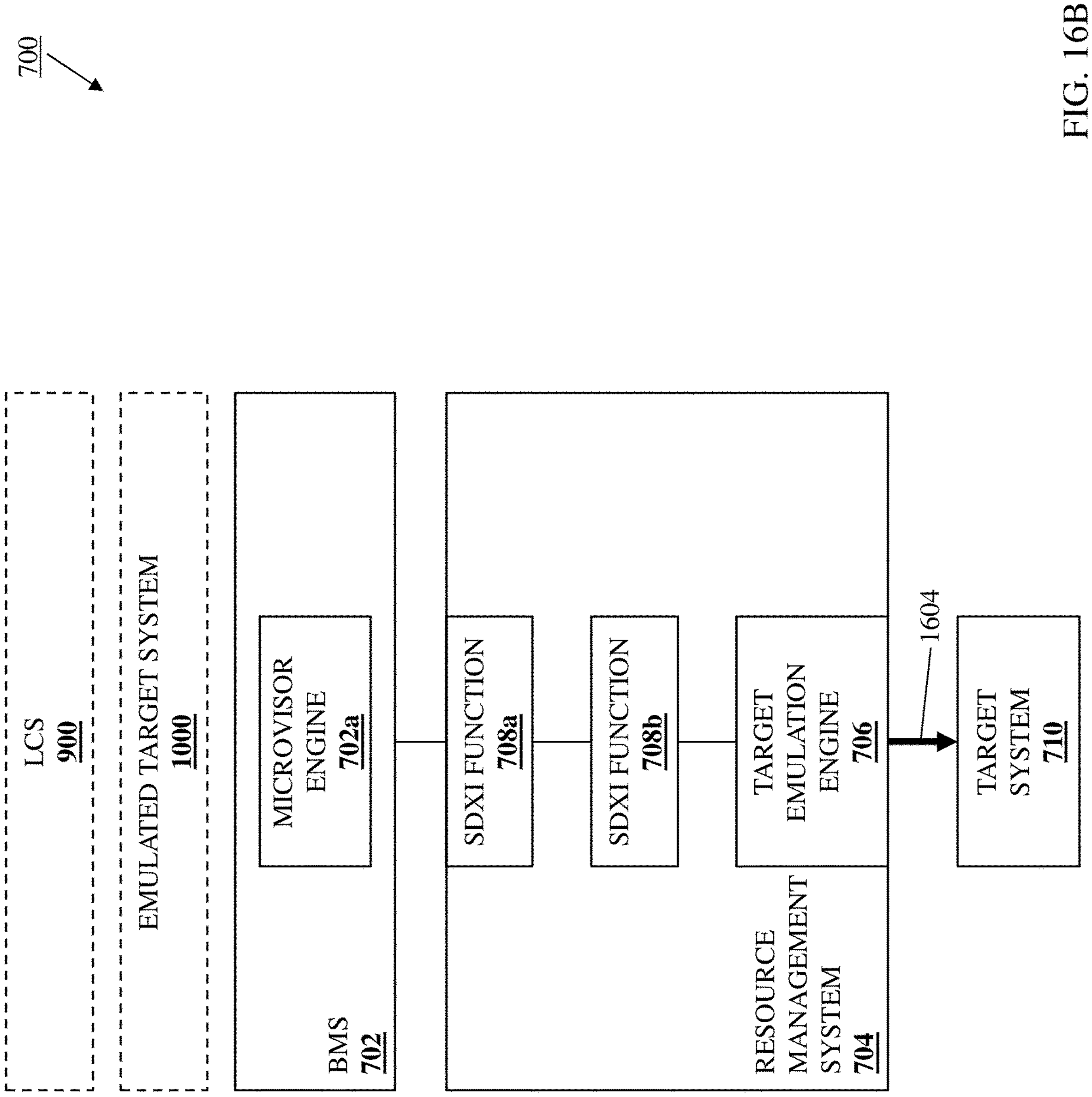
FIG. 16B is a schematic view illustrating an embodiment of the operation of the LCS provisioning system of FIG. 7 operating during the method of FIG. 8.

Furthermore, as illustrated in FIG. 16B, this second embodiment of block 810*a* of the method 800 may also include target emulation engine 706 performing a data write operation 1604 to write the data that was written to the target emulation memory address space by the SDXI function 708*b* to the target system 1604 (e.g., an NVMe storage device, a file system, etc.) using any of a variety of data write techniques that would be apparent to one of skill in the art in possession of the present disclosure, which one of skill in the art in possession of the present disclosure will appreciate completes the data write command/target command provided by the LCS 900 at block 806 (e.g., along with any data write command/target command completion messages that would be apparent to one of skill in the art in possession of the present disclosure).

Thus, systems and methods have been described that offload target driver stacks from microvisors on server devices (or other resource systems) that provide LCSs to target emulation subsystems in an SCP device (or other resource management system). For example, the LCS microvisor target driver stack offload system of the present disclosure may include a resource management system coupled to a target system and to a server device including a microvisor subsystem that provides an LCS having an LCS memory address space that does not include a target driver stack for the target system. The resource management system receives an SDXI communication from the microvisor subsystem using a first SDXI function, and uses a second SDXI function to provide a target command in the SDXI communication to a target emulation subsystem including the target driver stack for the target system. The resource management system then uses the target emulation subsystem to execute the target command with the target system and, as part of the target command execution, uses the first SDXI function to perform a data transfer between the LCS memory address space and the target system using a PASID that is accessible using the SDXI communication. As such, the target driver stack footprints of microvisors and their server devices/resource systems may be minimized via an abstraction implemented (e.g., via Application Programming Interfaces (APIs)) using SDXI functions in SCP devices/resource management systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) microvisor target driver stack offload system, comprising:

a target system;

a server device that includes a microvisor subsystem that does not include a target driver stack for the target system and that is configured to provide a Logically Composed System (LCS) having an LCS memory address space; and a resource management system that is coupled to the target system and the server device, wherein the resource management system is configured to:

receive, from the microvisor subsystem, a Smart Data Accelerator Interface (SDXI) communication using a first SDXI function provided by the resource management system;

provide, using a second SDXI function provided by the resource management system, a target command in the SDXI communication to a target emulation subsystem that is provided by the resource management system and that includes the target driver stack for the target system;

execute, using the target emulation subsystem, the target command with the target system; and perform, using the first SDXI function and as part of the execution of the target command, a data transfer between the LCS memory address space and the target system using a Process Address Space IDentifier (PASID) that is accessible using the SDXI communication.

2. The system of claim 1, wherein the target command is a data read command, and wherein the first SDXI function uses the PASID to write data that was read from the target system to the LCS memory address space.

3. The system of claim 1, wherein the target command is a data write command, and wherein the first SDXI function uses the PASID to read data from the LCS memory address space and provide that data to the second SDXI function and the target emulation subsystem for writing to the target system.

4. The system of claim 1, wherein the SDXI communication includes an SDXI descriptor that identifies the target system and the PASID.

5. The system of claim 1, wherein the target system is one of an Non-Volatile Memory express (NVMe) device or a file system.

6. The system of claim 1, wherein the PASID is unique to the LCS.

7. The system of claim 1, wherein the microvisor subsystem is configured to:

allocate the PASID to the LCS; and present an emulated target system to the LCS.

8. An Information Handling System (IHS), comprising:

a processing system; and a memory system that is coupled to the processing system and that includes instructions that, when executed by the processing system, cause the processing system to provide a resource management engine that is configured to:

receive, from a microvisor subsystem that is coupled to the processing system, that is configured to provide a Logically Composed System (LCS) having an LCS memory address space, and that does not include a target driver stack for a target system that is coupled to the processing system, a Smart Data Accelerator Interface (SDXI) communication using a first Smart Data Accelerator Interface (SDXI) function provided by the resource management engine;

provide, using a second SDXI function provided by the resource management engine, a target command in the SDXI communication to a target emulation subsystem that is provided by the resource management engine and that includes the target driver stack for the target system;

execute, using the target emulation subsystem, the target command with the target system; and perform, using the first SDXI function and as part of the execution of the target command, a data transfer between the LCS memory address space and the target system using a Process Address Space IDentifier (PASID) that is accessible using the SDXI communication.

9. The IHS of claim 8, wherein the target command is a data read command, and wherein the first SDXI function uses the PASID to write data that was read from the target system to the LCS memory address space.

10. The IHS of claim 8, wherein the target command is a data write command, and wherein the first SDXI function uses the PASID to read data from the LCS memory address space and provide that data to the second SDXI function and the target emulation subsystem for writing to the target system.

11. The IHS of claim 8, wherein the SDXI communication includes an SDXI descriptor that identifies the target system and the PASID.

12. The IHS of claim 8, wherein the target system is one of an Non-Volatile Memory express (NVMe) device or a file system.

13. The IHS of claim 8, wherein the PASID is unique to the LCS.

14. A method for offloading a target driver stack from a microvisor providing an Logically Composed System (LCS), comprising:

receiving, by a resource management system from a microvisor subsystem that is configured to provide a Logically Composed System (LCS) having an LCS memory address space and that does not include a target driver stack for a target system that is coupled to the resource management system, a Smart Data Accelerator Interface (SDXI) communication using a first Smart Data Accelerator Interface (SDXI) function provided by the resource management system;

providing, by the resource management system using a second SDXI function provided by the resource management system, a target command in the SDXI communication to a target emulation subsystem that is provided by the resource management system and that includes the target driver stack for the target system;

executing, by the resource management system using the target emulation subsystem, the target command with the target system; and performing, by the resource management system using the first SDXI function and as part of the execution of the target command, a data transfer between the LCS memory address space and the target system using a Process Address Space IDentifier (PASID) that is accessible using the SDXI communication.

15. The method of claim 14, wherein the target command is a data read command, and wherein the first SDXI function uses the PASID to write data that was read from the target system to the LCS memory address space.

16. The method of claim 14, wherein the target command is a data write command, and wherein the first SDXI function uses the PASID to read data from the LCS memory address space and provide that data to the second SDXI function and the target emulation subsystem for writing to the target system.

17. The method of claim 14, wherein the SDXI communication includes an SDXI descriptor that identifies the target system and the PASID.

18. The method of claim 14, wherein the target system is one of an Non-Volatile Memory express (NVMe) device or a file system.

19. The method of claim 14, wherein the PASID is unique to the LCS.

20. The method of claim 14, further comprising:

allocating, by the microvisor, the PASID to the LCS; and presenting, by the microvisor, an emulated target system to the LCS.

* * * * *